(12) United States Patent
Hashimoto

(10) Patent No.: US 7,117,281 B1
(45) Date of Patent: Oct. 3, 2006

(54) CIRCUIT, SYSTEM, AND METHOD FOR DATA TRANSFER CONTROL FOR ENHANCING DATA BUS UTILIZATION

(75) Inventor: Kazuhiro Hashimoto, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/664,856

(22) Filed: Sep. 19, 2000

(30) Foreign Application Priority Data

Sep. 20, 1999 (JP) ............................... P11-266299

(51) Int. Cl.
G06F 13/00 (2006.01)
(52) U.S. Cl. ...................... 710/107; 710/240; 710/241; 710/242; 710/243; 710/244
(58) Field of Classification Search ................ 710/107, 710/113, 110, 305, 116, 240–244, 100, 260–266; 340/14
See application file for complete search history.

(56) References Cited

U.S. PATENT DOCUMENTS 4,941,086 A    7/1990   Kriz
5,894,562 A *  4/1999   Moyer .......................... 710/113
6,061,756 A *  5/2000   Dutton et al. ................. 710/311
6,070,205 A *  5/2000   Kato et al. .................... 710/100
6,101,570 A *  8/2000   Neumyer ...................... 710/240
6,173,349 B1 * 1/2001   Qureshi et al. .............. 710/110
6,323,755 B1 * 11/2001  Lee et al. ................. 340/14.69
6,393,506 B1 * 5/2002   Kenny .......................... 710/113
6,604,159 B1 * 8/2003   Thekkath et al. ........... 710/110

* cited by examiner

Primary Examiner—Rehana Perveen
Assistant Examiner—Kim T. Huynh
(74) Attorney, Agent, or Firm—Oblon, Spivak, McClelland, Maier & Neustadt, P.C.

(57) ABSTRACT

In a system having a plurality of bus masters, system and method for enhancing data bus utilization are disclosed. This system comprises: a data bus connected to a peripheral apparatus and composed of a plurality of unit data buses each capable of carrying out data transfer independently; a plurality of bus masters each for sending a request signal requesting a use of the data bus in unit data buses, and using the data bus in unit data buses requested when a request by means of the request signal is granted; and a bus controller for giving a grant signal which grants the use of the data bus in unit data buses requested in unit data buses to the bus masters in accordance with an availability of the data bus in unit data buses, thereby split-controlling the data bus in unit data buses for the plurality of bus masters.

26 Claims, 12 Drawing Sheets

CIRCUIT, SYSTEM, AND METHOD FOR DATA TRANSFER CONTROL FOR ENHANCING DATA BUS UTILIZATION

BACKGROUND OF THE INVENTION

1. Field of the Invention

The present invention relates to circuit, system, and method for data transfer control for enhancing data bus utilization, and more particularly to a technique to enhance data bus utilization in an information processing system having a plurality of bus masters for carrying out data transfer through a data bus composed of a plurality of unit data buses by carrying out data transfer by split-controlling the data bus in unit data buses.

2. Description of the Background Art

A conventional information processing system for controlling data transfer by means of a plurality of data buses has an arrangement as shown in FIG. 1, for example. The system of FIG. 1 includes a central processing unit (CPU) 101 and a direct memory access controller (DMAC) 102 serving as bus masters, a memory 103, and a peripheral 104, which are interconnected to each other through a data bus 105 and an address bus 106. In FIG. 1, the CPU 101 and DMAC 102 serve as the bus masters and control a bus use (bus access).

In the foregoing system, as a first mechanism of bus arbitration of the data bus 105 using polling processing, the bus masters 101 and 102 control the bus use by using a req signal which is a bus use request signal from the DMAC 102 and a gnt signal which is a grant signal of bus use transfer. To be more specific, when the CPU 101 can release the data bus 105 in response to the bus use request signal (req signal) from the DMAC 102, the CPU 101 outputs the gnt signal to the DMAC 102, whereby the bus use is transferred to the DMAC 102 from the CPU 101. On the other hand, when the bus use is returned to the CPU 101, the gnt signal is inactivated, so that the CPU 101 acquires the bus use (bus access).

In the polling processing during the DMA data transfer in the system adopting the foregoing bus arbitration method, an I/O access from the CPU 101 frequently occurs during the DMA data transfer by the DMAC 102. In other words, an access (I/O access) to a register or the like retaining control information for the polling processing frequently occurs during the data transfer.

FIG. 2 is a timing chart showing timing of the polling processing during the DMA data transfer and an example of an occupancy state of one data bus composed of four unit data buses (the unit data buses have data widths of 8, 16, 32 bits, for example) in the foregoing system. In FIG. 2, the req signal and gnt signal are indicated as low-active signals (signals which are active in the low state).

With the I/O access necessary for the polling processing, the width of the register to be accessed is 16 bits or 32 bits, for example, which is far smaller than the width of the data bus. Further, in general, one byte or one word is sufficient for the control information of the polling processing retained in the register. On the other hand, a wider bus width is provided in the recent systems, and a bus having a width of 128 bits is not unusual.

However, in the conventional bus control system, the DMA data transfer is suspended while the I/O access is occurring for the polling processing. For example, when transfer data to be transferred by the I/O access is one byte, if the bus width is 128 bits, only 6% of the bus is utilized, and only 25% is utilized even when the transfer data is one word, thereby reducing the bus utilization and data transfer efficiency. Further, the larger the bandwidth of the data bus, the lower the data bus utilization becomes. In addition, when operating rates are different in the CPU and peripheral, the latency in the I/O access during the polling processing becomes larger. Thus, the I/O access for the polling processing occupies the data bus for a longer period, thereby reducing the data bus utilization further.

FIG. 3 is a second bus control mechanism of the information processing system. The system of FIG. 3 includes a central processing unit (CPU) 107 and a direct memory access controller (DMAC) 108 serving as bus masters, a memory 103 and a peripheral 104, which are interconnected to each other through a data bus 105 and an address bus 106. In this system, as a method of bus arbitration of the data bus 105, the bus arbitration is carried out by using a req signal which is a bus use request signal from the DMAC 108, a gnt signal which is a grant signal of bus use transfer, and a rel signal which is a bus release request signal from the CPU 107 for allowing the CPU 107 to temporarily acquire the bus use during the DMA data transfer.

In the system using the second bus arbitration mechanism, the data bus 105 cannot be released until the break of the DMA data transfer even when the bus release request signal (rel signal) from the CPU 107 is asserted, and therefore, the CPU 107 may stall.

FIG. 4 shows, as an example of such a stall, timing when the I/O access for the polling processing interrupts during the DMA data transfer and an example of an occupancy state of the data bus 105. In FIG. 4, the req signal, gnt signal, and rel signal are indicated as low-active signals. FIG. 4 shows that even when the CPU 107 asserts the release request signal (rel signal) of the data bus 105 to the DMAC 108 to allow the I/O access for the polling processing, the DMAC 108 does not release the data bus 105 until a break of the DMA transfer processing, thereby causing the CPU 107 to stall during that period.

As has been explained, in the conventional information processing system, wherein a plurality of bus masters carry out data transfer through the data bus, if the I/O access occurs for the polling processing or the like by the CPU during the DMA data transfer, the DMA data transfer and I/O access cannot be carried out simultaneously regardless of the fact that only a part of the data bus is necessary for the data transferred by the I/O access. For this reason, the data bus utilization is reduced.

In addition, when the I/O access for the polling processing or the like by the CPU occurs during the DMA data transfer, the data bus is not released until a break of the DMA data transfer, thereby posing a problem that the CPU stalls.

SUMMARY OF THE INVENTION

It is therefore an object of the present invention to provide an information processing system for carrying out arbitration control of data transfer by means of a plurality of bus masters, which is capable of enhancing the data bus utilization by appending data that specifies a unit data bus to a signal relating to the use of the data bus and used between the plurality of bus masters and the bus controller, so that the unit data bus is split-controlled dynamically in data buses.

To achieve the object, an aspect of the invention provides a data transfer control circuit for carrying out data transfer by using a plurality of bus masters, comprising: a data bus connected to a peripheral apparatus and composed of a plurality of unit data buses each capable of carrying out data transfer independently; a plurality of bus masters each for sending a request signal requesting a use of the data bus in unit data buses, and using the data bus in unit data buses requested when a request by means of the request signal is granted; and a bus controller for split-controlling the data bus in unit data buses for the plurality of bus masters by giving a grant signal which grants the use of the data bus in unit data buses requested in unit data buses to the bus masters in accordance with an availability of the data bus in unit data buses.

Preferably, the bus controller gives the grant signal of the use of the data bus to the bus masters upon receipt of a request or release of the use of the data bus in unit data buses inputted from the bus masters.

Preferably, the bus controller includes a monitor circuit for monitoring the availability of the data bus in unit data buses.

Preferably, the bus controller judges whether the data bus is available in unit data buses based on a monitoring result by the monitor circuit, and when the data bus is available, the bus controller gives the grant signal of the using right of the data bus to the bus master.

Preferably, the bus controller sends a state signal indicating the availability of the data bus in unit data buses to each of the bus masters based on a monitoring result of the monitor circuit.

Preferably, the request signal includes information specifying each unit data bus in the data bus, or the request signal includes information specifying the number of the unit data buses in the data bus.

To achieve the object, another aspect of the invention provides an information processing system for carrying out data transfer by using a plurality of bus masters, comprising: a peripheral apparatus; a data bus connected to the peripheral apparatus and composed of a plurality of unit data buses each capable of carrying out data transfer independently; a plurality of bus masters each for sending a request signal requesting a use of the data bus in unit data buses, and using the data bus in unit data buses requested when a request by means of the request signal is granted; and a bus controller for split-controlling the data bus in unit data buses for the plurality of bus masters by giving a grant signal which grants the use of the data bus in unit data buses requested in unit data buses to the bus masters in accordance with an availability of the data bus in unit data buses.

To achieve the object, still another aspect of the invention provides a method of carrying out data transfer by using a plurality of bus masters, comprising the steps of: generating a request signal requesting a use of a data bus in unit data buses in each of a plurality of bus masters and sending each request signal to a bus controller, the data bus being connected to a peripheral apparatus and composed of a plurality of unit data buses each capable of carrying out data transfer independently; sending, in response to the request signal, a grant signal granting the use of the data bus in unit data buses requested in unit data buses to the bus master in accordance with an availability of the data bus in unit data buses; and occupying the data bus granted by the grant signal in unit data buses, and carrying out data transfer by using the unit data buses thus occupied.

Other features and advantages of the present invention will become apparent from the following description taken in conjunction with the accompanying drawings.

BRIEF DESCRIPTION OF DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The following description will describe in detail preferred embodiments of a data transfer control circuit, an information processing system and a data transfer method of the present invention for enhancing data transfer utilization with reference to FIGS. 5 to 12.

First Embodiment

Figure 1:
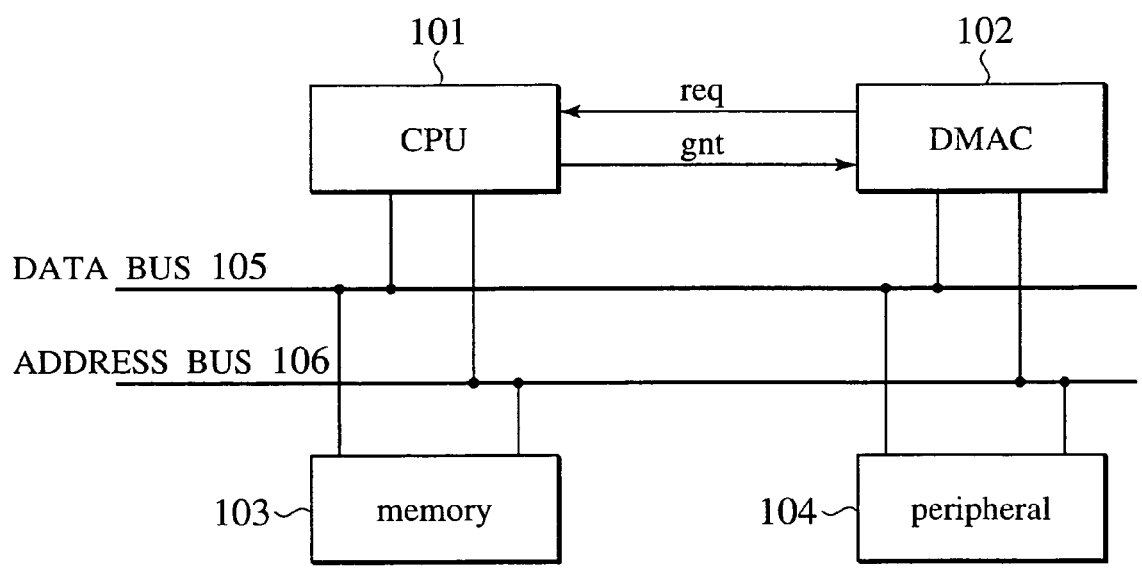
FIG. 1 is a block diagram depicting an example of an arrangement of a conventional information processing system including a plurality of bus masters.
Figure 2:
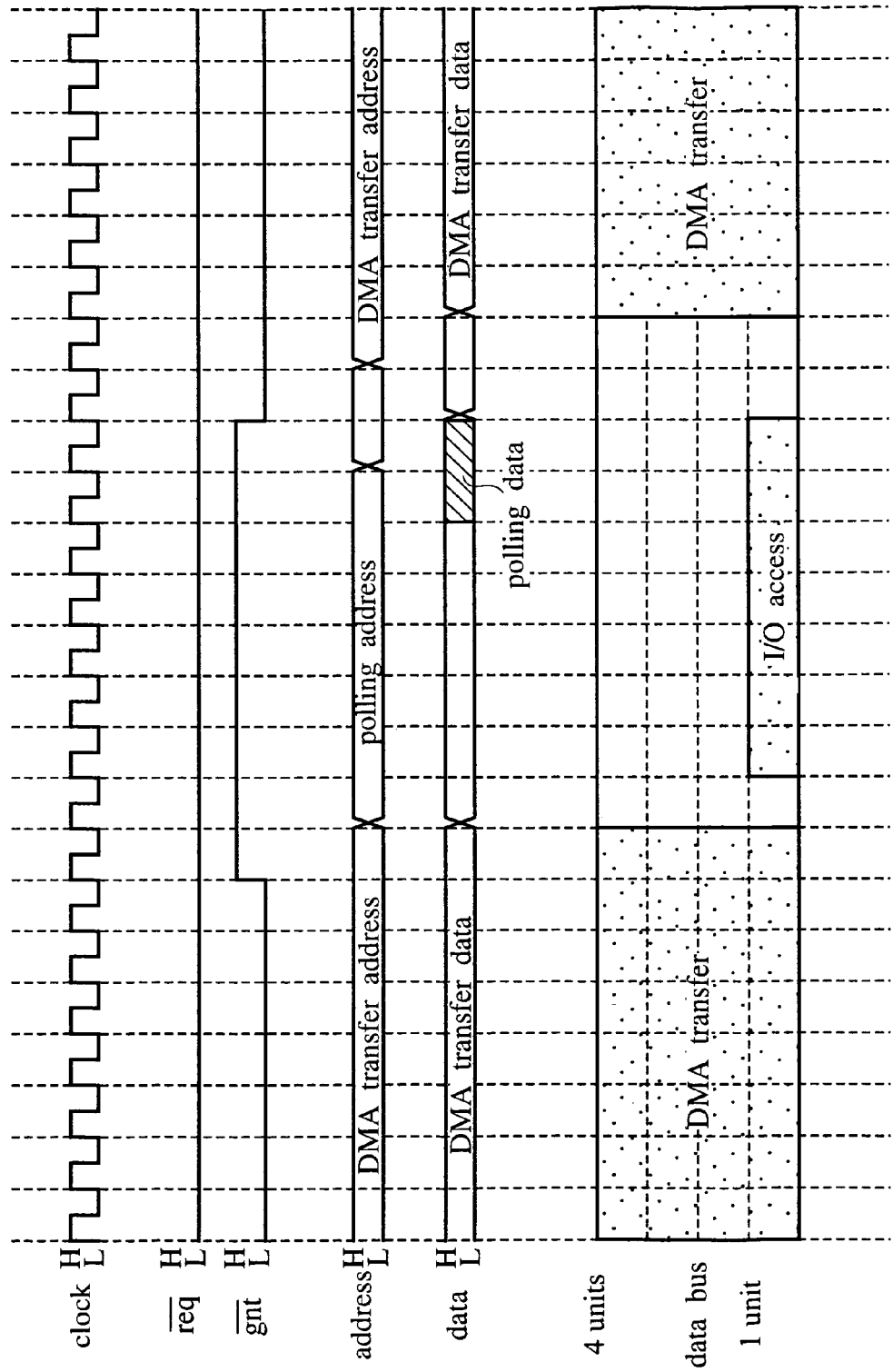
FIG. 2 is a view showing operation timing and an occupancy state of a use of a data bus in the information processing system in FIG. 1.
Figure 3:
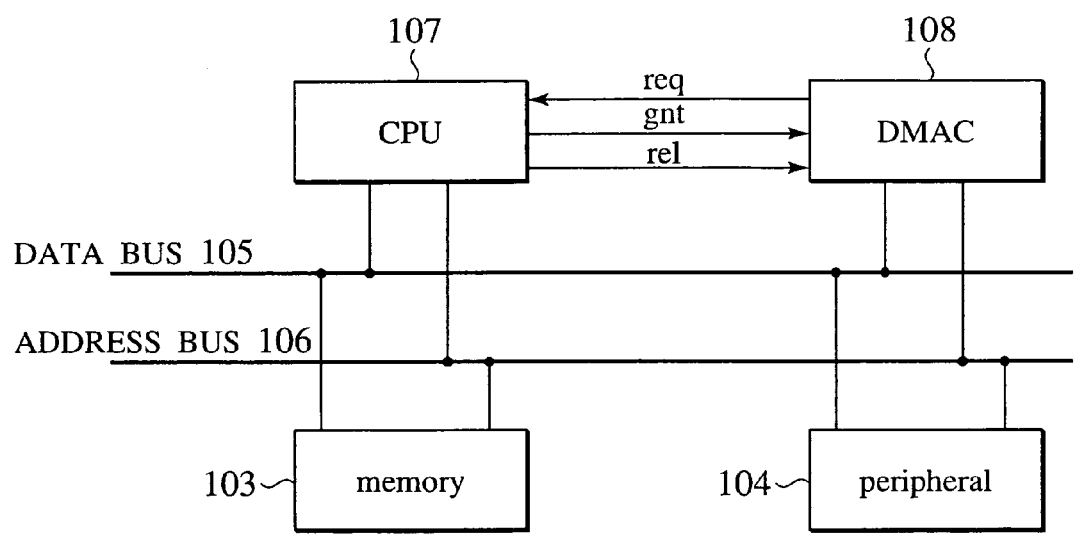
FIG. 3 is a block diagram depicting an example of another arrangement of the conventional information processing system including a plurality of bus masters.
Figure 4:
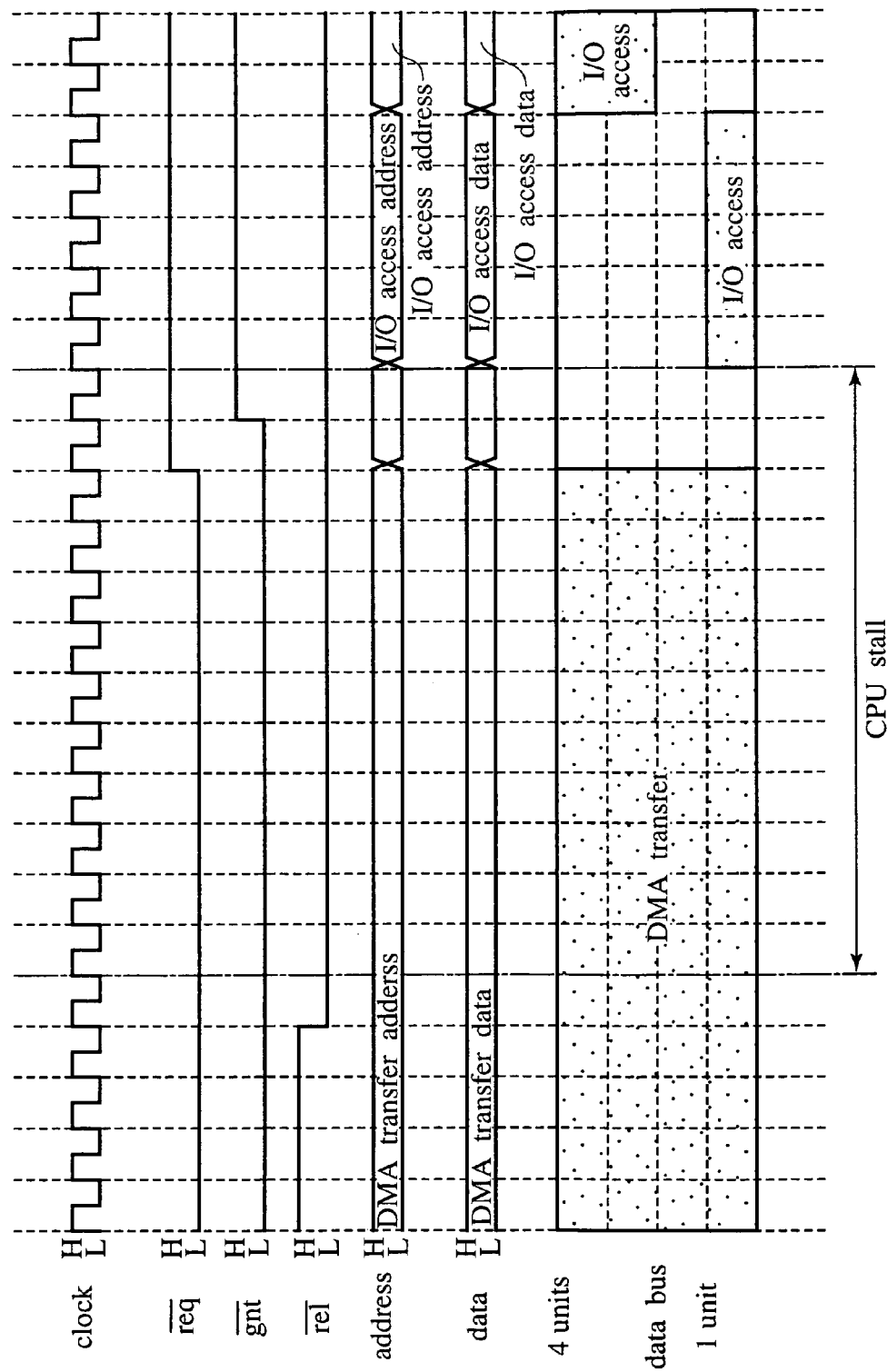
FIG. 4 is a view showing operation timing and an occupancy state of the use of the data bus in the information processing system in FIG. 3.
Figure 5:
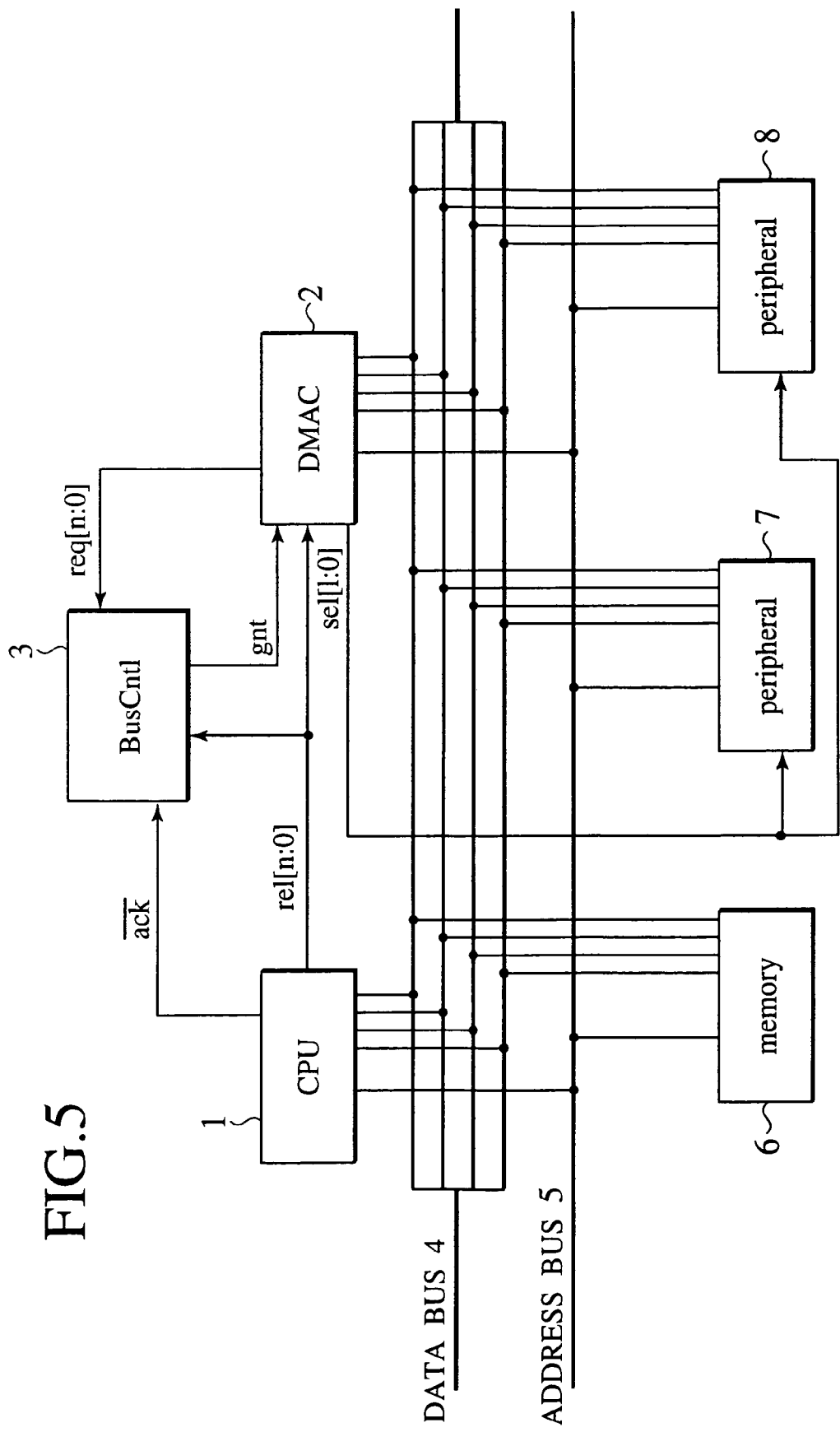
FIG. 5 is a block diagram depicting an arrangement of an information processing system according to a first embodiment of the present invention.
Figure 6:
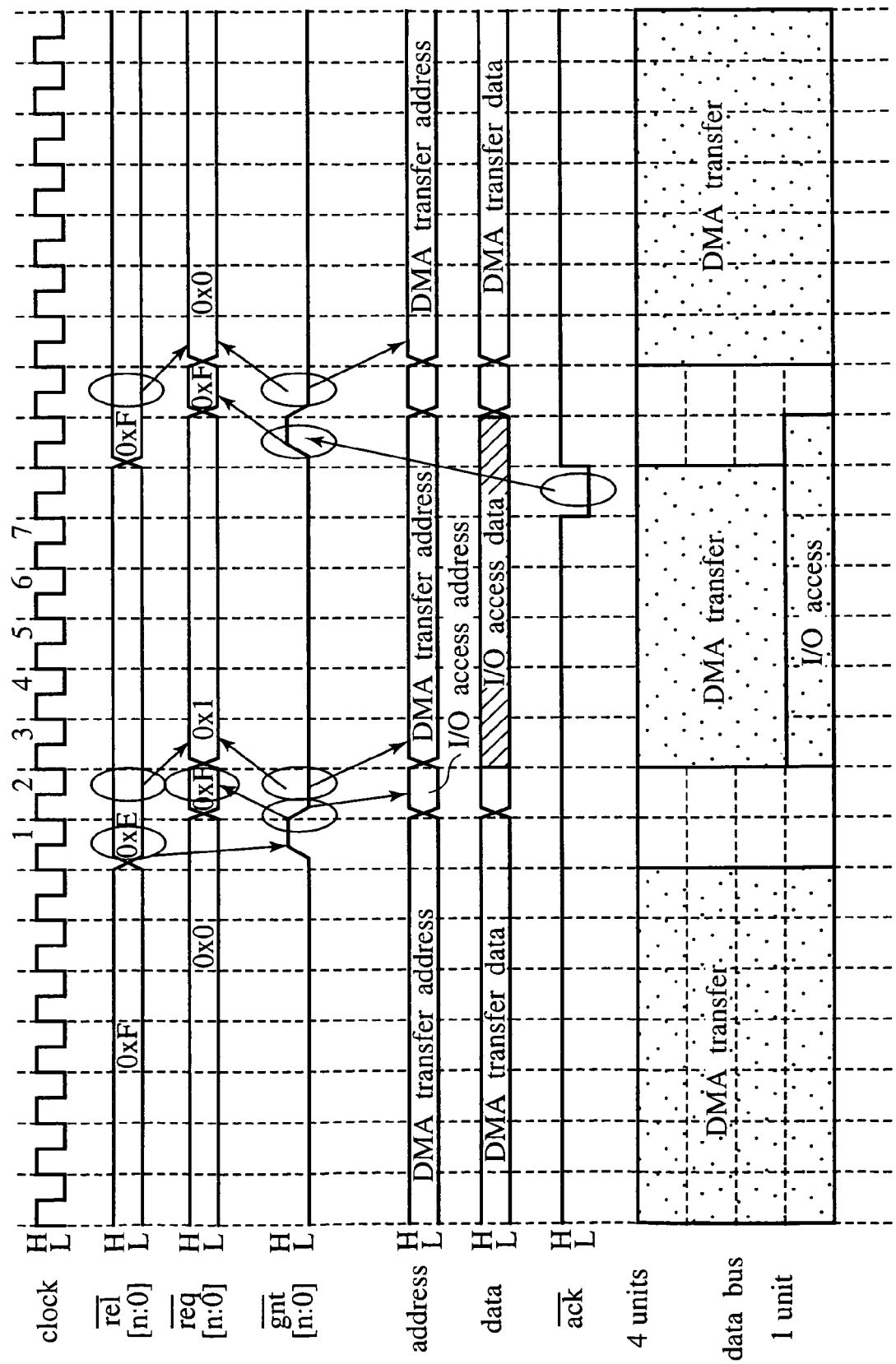
FIG. 6 is a view showing operation timing and an occupancy state of the use of the data bus in the information processing system in FIG. 5.

The following description will describe in detail a first embodiment of the present invention with reference to FIGS. 5 and 6. The first embodiment provides a function to dynamically split-control a data bus in unit data buses.

FIG. 5 is a block diagram depicting an arrangement of an information processing system according to the first embodiment, and FIG. 6 is a view showing operation timing and an occupancy state of a use of the data bus in the system shown in FIG. 5.

As shown in FIG. 5, the information processing system according to the first embodiment comprises a CPU 1 and a direct memory access controller (DMAC) 2 serving as bus masters, a bus controller 3 for controlling split use of a data bus 4 by the CPU 1 and DMAC 2, the data bus 4 composed of, for example, four unit data buses, a memory 6 connected to the CPU 1 and DMAC 2 through the data bus 4 and an address bus 5, and peripherals (I/O) 7 and 8.

The data bus 4 is composed of a plurality of unit data buses each having an arbitrary bus width. Each unit data bus has an arbitrary data width, such as 8, 16, and 32 bits, and is allowed to control data transfer independently.

The CPU 1 gives a bus release request signal (rel[n:0]) which allows the CPU 1 to temporarily acquire a bus use(bus access) during the DMA data transfer to the DMAC 2 and bus controller 3, and an acknowledge signal (ack) which indicates the completion of an I/O access to the bus controller 3. Hereinafter, the I/O access includes an access to a register that retains polling information used for bus arbitration, and an access to each peripheral connected to the data bus.

The DMAC 2 gives a bus request signal (req[n:0]) for the DMA data transfer to the bus controller 3, and a select signal (sel[1:0]) which selects the I/O to be used by the DMAC 2 to the I/O (peripherals) 7 and 8. The bus controller 3 gives a bus grant signal (gnt[n:0]) which indicates the grant of a use of the data bus 4 by the DMAC 2 to the DMAC 2. By transmitting the foregoing signals, the bus controller 3 split-controls the data bus 4 for the CPU 1 and DMAC 2.

In the first embodiment, each bit in the bus release request signal (rel[n:0]), bus request signal (req[n:0]), bus grant signal (gnt[n:0]) corresponds to each unit of the bus to be split-controlled. Also, each bit in the select signal (sel[1:0]) of the peripherals corresponds to their respective peripherals.

Next, the following description will describe an example of the split-control of the data bus 4 with reference to the operation timing chart of FIG. 6.

In the first place, before clock 1 in FIG. 6, the DMA data transfer has been carried out by using all the unit data buses (n+1 units) of the data bus 4. Under these circumstances, in the cycle (clock) 1 in FIG. 6, the CPU 1 asserts a release signal (rel[n:0]) of a unit data bus to be accessed in issuing a bus access request. Upon receipt of the release signal (rel), the bus controller 3 inactivates the grant signal (gnt). In the clock 2 in FIG. 6, upon detection of the inactive gnt signal, the DMAC 2 invalidates data transfer in the cycle where the gnt signal is inactivated, and deasserts the req signal to abort the bus use (bus access) temporarily. The bus controller 3 asserts the gnt signal again. The CPU 1 outputs an address of the I/O access to the address bus 5.

At the clock 3 in FIG. 6, the CPU 1 starts to use one unit data bus in the data bus 4 requested by the rel signal. The DMAC 2 selects the data bus 4 to be used by the same from the rel signal and gnt signal at the clock 2 in FIG. 6, and outputs the req signal (req[n:0]) corresponding to the selected data bus 4. Then, the DMAC 2 starts the DMA data transfer through the selected data bus 4.

The above example explained a case where the request signal (req signal, rel signal, etc.) explicitly specifies a requested unit data bus in the data bus 4. However, the request signal may merely specify the number of the unit data buses, and a monitoring mechanism monitors available unit data buses in the bus controller 3 side to assign the available unit data buses to the bus masters as necessary.

According to the first embodiment, a plurality of bus masters (for example, the CPU 1 and DMAC 2) request the use of the data bus by specifying the unit data buses in the data bus 4 to the bus controller 3, and correspondingly, the bus controller 3 split-controls the data bus 4 dynamically for the plurality of bus masters. Consequently, the utilization of the data bus 4 can be enhanced, and hence the transfer efficiency of the DMA data transfer can be improved.

Second Embodiment

Figure 7:
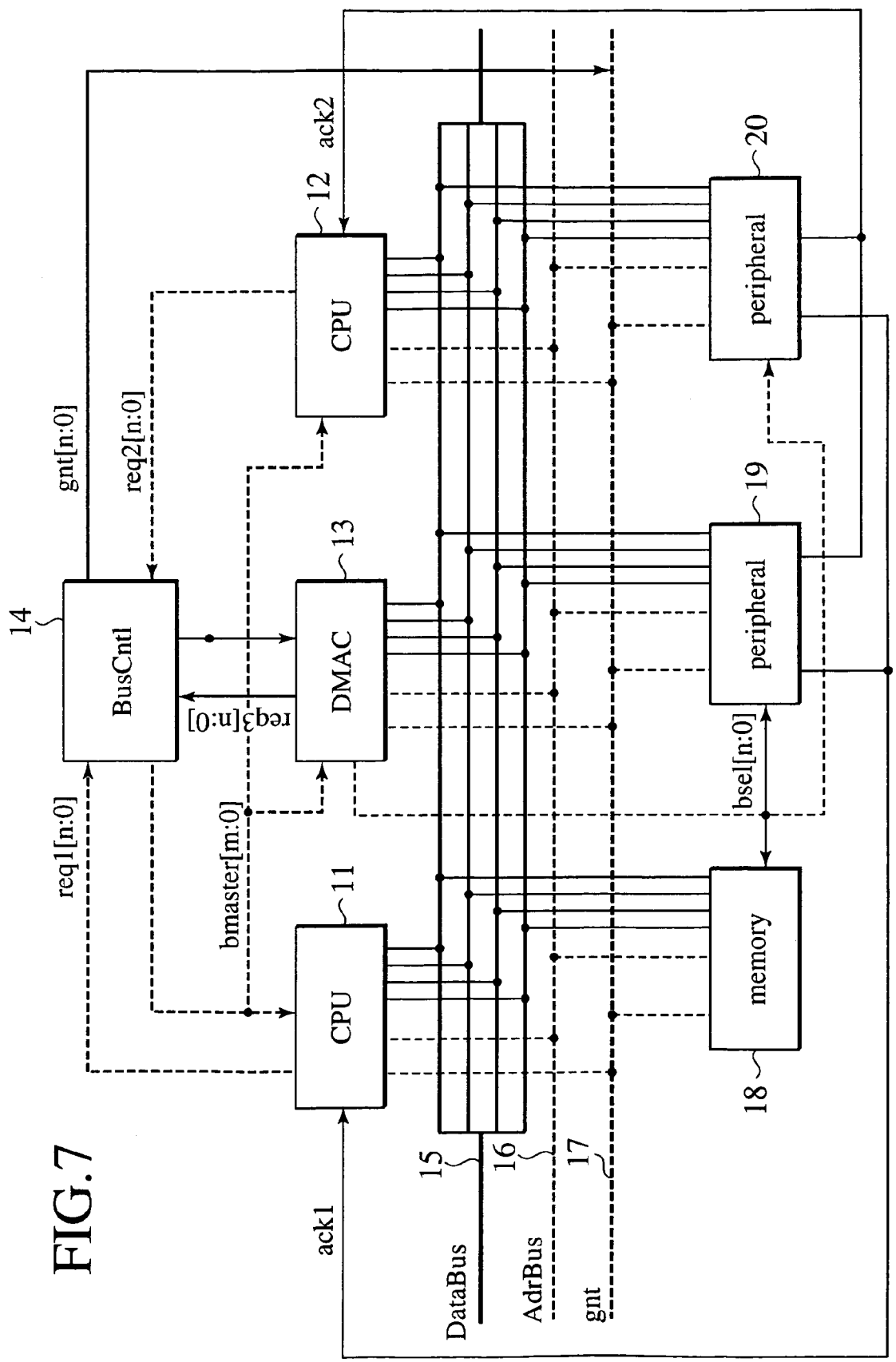
FIG. 7 is a block diagram depicting an arrangement of an information processing system according to a second embodiment of the present invention.
Figure 8:
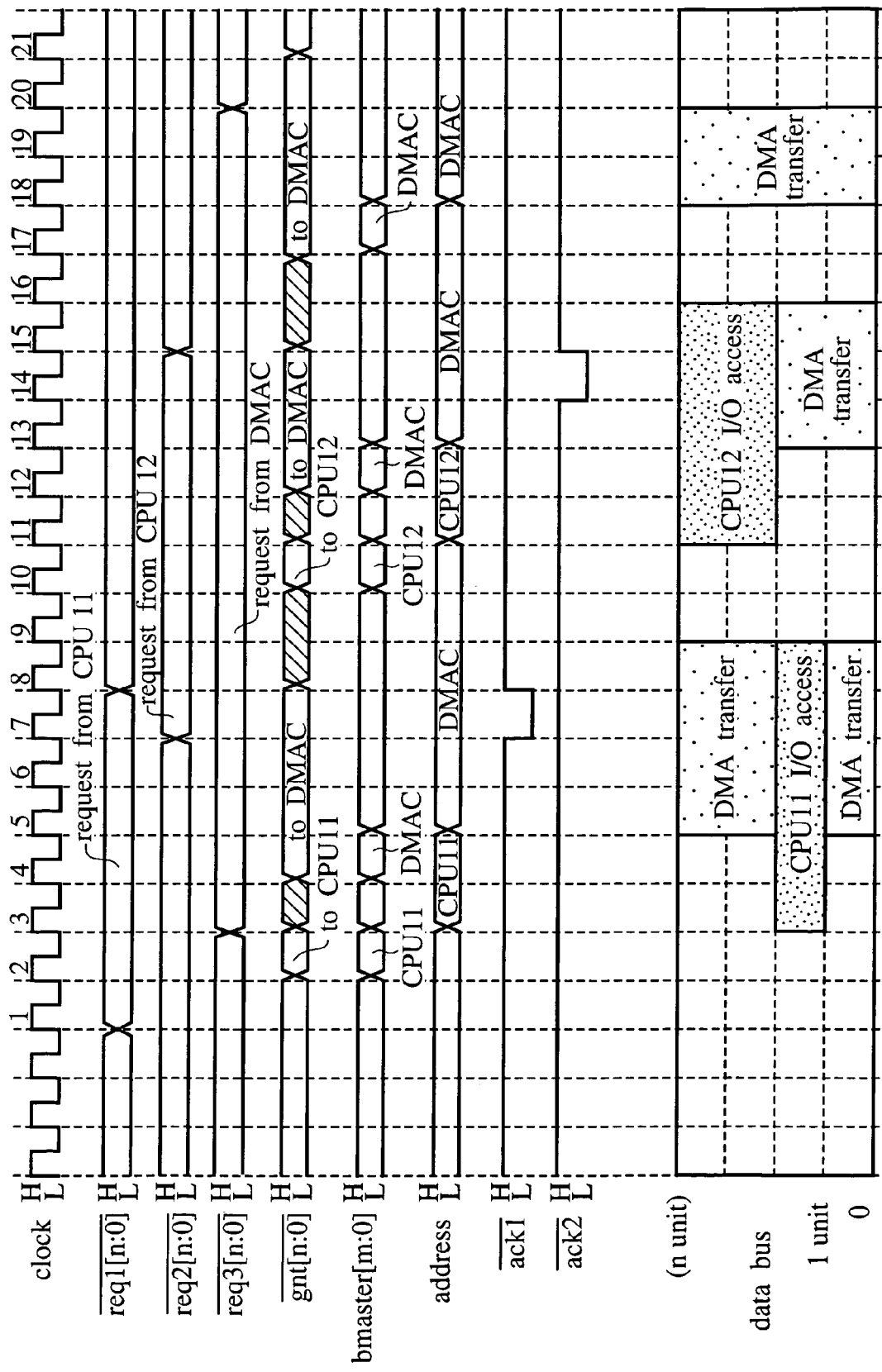
FIG. 8 is a view showing operation timing and an occupancy state of the use of the data bus in the information processing system in FIG. 7.

The following description will describe in detail a second embodiment of the information processing system according to the present invention as to the differences from the first embodiment alone with reference to FIGS. 7 and 8.

FIG. 7 is a view depicting an arrangement of the information processing system according to the second embodiment, and FIG. 8 is a view showing operation timing and an occupancy state of the use of the data bus of the system shown in FIG. 7.

As shown in FIG. 7, the system of the second embodiment is different from the counterpart of the first embodiment shown in FIG. 5 in that one more CPU serving as the bus master is provided. The information processing system shown in FIG. 7 comprises a CPU 11, a CPU 12, and a direct memory access controller (DMAC) 13 serving as bus masters, a bus controller 14 for controlling split use of a data bus 15 for the CPUs 11 and 12 and DMAC 13, the data bus 15, a control bus 17, a memory 18 connected to the CPUs 11 and 12 and DMAC 13 through the data bus 15 and an address bus 16, and peripherals (I/O) 19 and 20. The data bus 15 is composed of, for example, four unit data buses (the unit data buses have the data widths of 8, 16, 32 bits, for example), and each unit data bus is allowed to control the data transfer independently.

The CPU 11 gives a bus request signal (req1[n:0]) which requests a bus use to the bus controller 14, and an acknowledge signal (ack1) which indicates the completion of the I/O access inputted from the peripherals 19 and 20 to the bus controller 14. The CPU 12 gives a bus request signal (req2[n:0]) which requests a bus use to the bus controller 14, and an acknowledge signal (ack2) which indicates the completion of the I/O access inputted from the peripherals 19 and 20 to the bus controller 14.

The DMAC 13 gives a bus request signal (req3[n:0]) of the DMA transfer to the bus controller 14, and a bus select signal (bsel[n:0]) which indicates the data bus to be used for the DMA data transfer to the memory 18 and peripherals 19 and 20.

The bus controller 14 gives a bus grant signal (gnt[n:0]) which indicates the grant of a use of the data bus 15 of the CPUs 11 and 12 and DMAC 13 to the CPUs 11 and 12 and DMAC 13 through a grant signal line 17, and a bus master select signal (bmaster [m:0]) which indicates the current bus master to which the bas grant signal is given, to the CPUs 11 and 12 and DMAC 13. In the second embodiment, the (m+1) (m is a numerical value equal to or larger than 1) bits in the bus master select signal (bmaster [m:0]) select one of the three bus masters uniquely.

By transmitting the foregoing signals, the bus controller 14 split-controls the data bus 15 for the CPUs 11 and 12 and DMAC 13.

Next, the following description will describe an example of the split-control of the data bus 15 with reference to the operation timing chart in FIG. 8.

In the first place, in the cycle (clock) 1 in FIG. 8, the CPU 11 asserts the bus request signal (req1) to use the data bus 15. In the clock 2 in FIG. 8, the bus controller 14 arbitrates the bus request from the CPU 11 and asserts the bmaster signal (the signal assigning the CPU 11 as the bus master) and the gnt signal (the signal indicating which unit data bus is used by the CPU 11). In the clock 3 in FIG. 8, the CPU 11 starts to output an address for the bus access in response to the gnt signal. The bus controller 14 deasserts the gnt signal temporarily. The DMAC 13 outputs the req3 signal. The peripheral 19 or 20 to be accessed by the CPU 11 through the bus decodes the address and starts I/O access processing.

In the clock 4 in FIG. 8, the bus controller 14 arbitrates the bus request from the DMAC 13, and asserts the bmaster signal (the signal assigning the DMAC 13 as the bas master) and the gnt signal. In the clock 5 in FIG. 8, the DMAC 13 starts to output the address for the DMA data transfer to the address bus 16 in response to the gnt signal, and starts the DMA data transfer.

In the clock 7 in FIG. 8, the ack1 signal (the signal indicating the completion of the data transfer) of the bus access by the CPU 11 is asserted from the peripheral 19 or 20, whereupon the access by the CPU 11 is completed. The CPU 12 asserts the req2 signal to use the data bus 15.

In the cycle 8 in FIG. 8, the CPU 11 deasserts the req1 signal. Upon receipt of the req2 signal from the CPU 12, the bus controller 14 deasserts the gnt signal temporarily for the bus arbitration. In the cycle 9 in FIG. 8, upon receipt of the deassertion of the req1 signal of the CPU 11, the bus controller 14 deasserts the gnt signal temporarily for the bus arbitration.

In the cycle 10 in FIG. 8, the bus controller 14 arbitrates the bus request from the CPU 12, and asserts the bmaster signal (the signal assigning the CPU 12 as the bus master) and the gnt signal (the signal indicating the unit data bus to be used by the CPU 12). In the clock 11 in FIG. 8, the bus controller 14 deasserts the gnt signal temporarily to arbitrate the req3 signal from the DMAC 13 and the bus request from the CPU 12. In the clock 12 in FIG. 8, the bus controller 14 asserts the bmaster signal and gnt signal for the DMAC 13.

In the clock 13 in FIG. 8, the DMAC 13 starts to output the address for the DMA transfer to the address bus 16 in response to the gnt signal, and starts the DMA data transfer. In the clock 14 in FIG. 8, the ack2 signal that indicates the completion of the bus access by the CPU 12 is asserted for the CPU 12 from the peripheral 19 or 20, whereupon the access to the peripheral 19 or 20 by the CPU 12 is completed.

In the clock 15 in FIG. 8, the CPU 12 deasserts the req2 signal. In the clock 16 in FIG. 8, upon receipt of the deassertion of the req2 signal of the CPU 12, the bus controller 14 deasserts the gnt signal temporarily for the bus arbitration. In the clock 17 in FIG. 8, the bus controller 14 asserts the bmaster signal and gnt signal for the DMAC 13. In the clock 18 in FIG. 8, the DMAC 13 starts to output the address for the DMA data transfer to the address bus 16 in response to the gnt signal, and starts the DMA data transfer. In the clock 20 in FIG. 8, upon completion of the DMA data transfer, the DMAC 13 deasserts the req3 signal. In the clock 21 in FIG. 8, upon receipt of the deassertion of the req3 signal by the DMAC 13, the bus controller 14 deasserts the gnt signal temporarily for the bus arbitration.

When the bus requests from a plurality of bus masters are arbitrated, which bus master should be indicated by the bmaster signal as the current bus master may be determined by the priority (for example, a higher priority is given to the CPU than the DMAC) assigned to each bus master, or the availability of the unit data buses.

According to the second embodiment, a plurality of bus masters (for example, the CPUs 11 and 12 and DMAC 13) request the use of the data bus by specifying the unit data buses in the data bus 15 to the bus controller 14, and the bus controller 14 split-controls the data bus 15 for the plurality of bus masters. Consequently, the utilization of the data bus 15 can be enhanced, and hence the transfer efficiency of the DMA data transfer can be improved. In addition, because it is not necessary to stall the bus use request from the CPU until the DMA data transfer is completed, the stall period for each of the CPUs 11 and 12 can be shortened.

Third Embodiment

Figure 9:
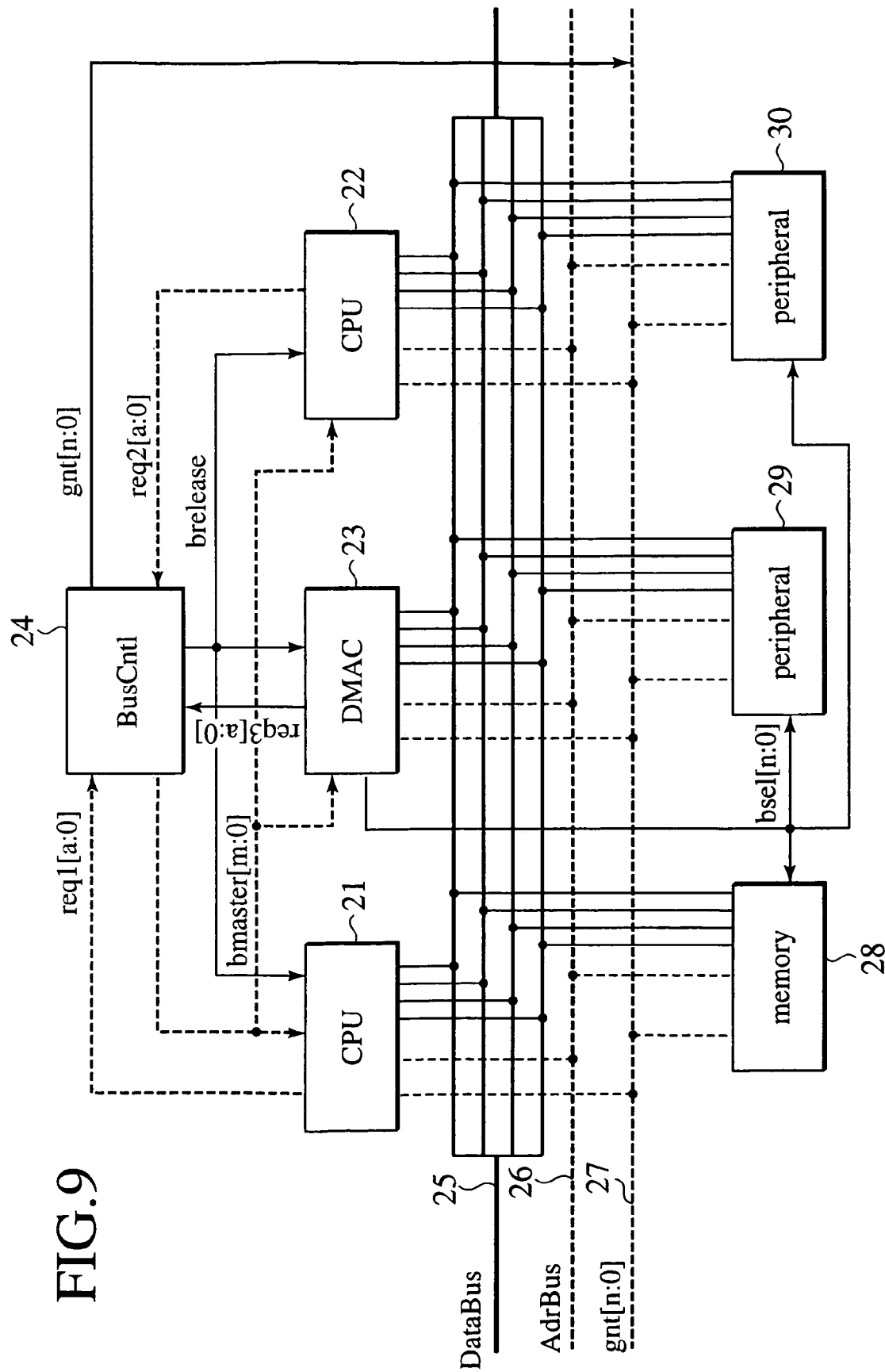
FIG. 9 is a block diagram depicting an arrangement of an information processing system according to a third embodiment of the present invention.
Figure 10:
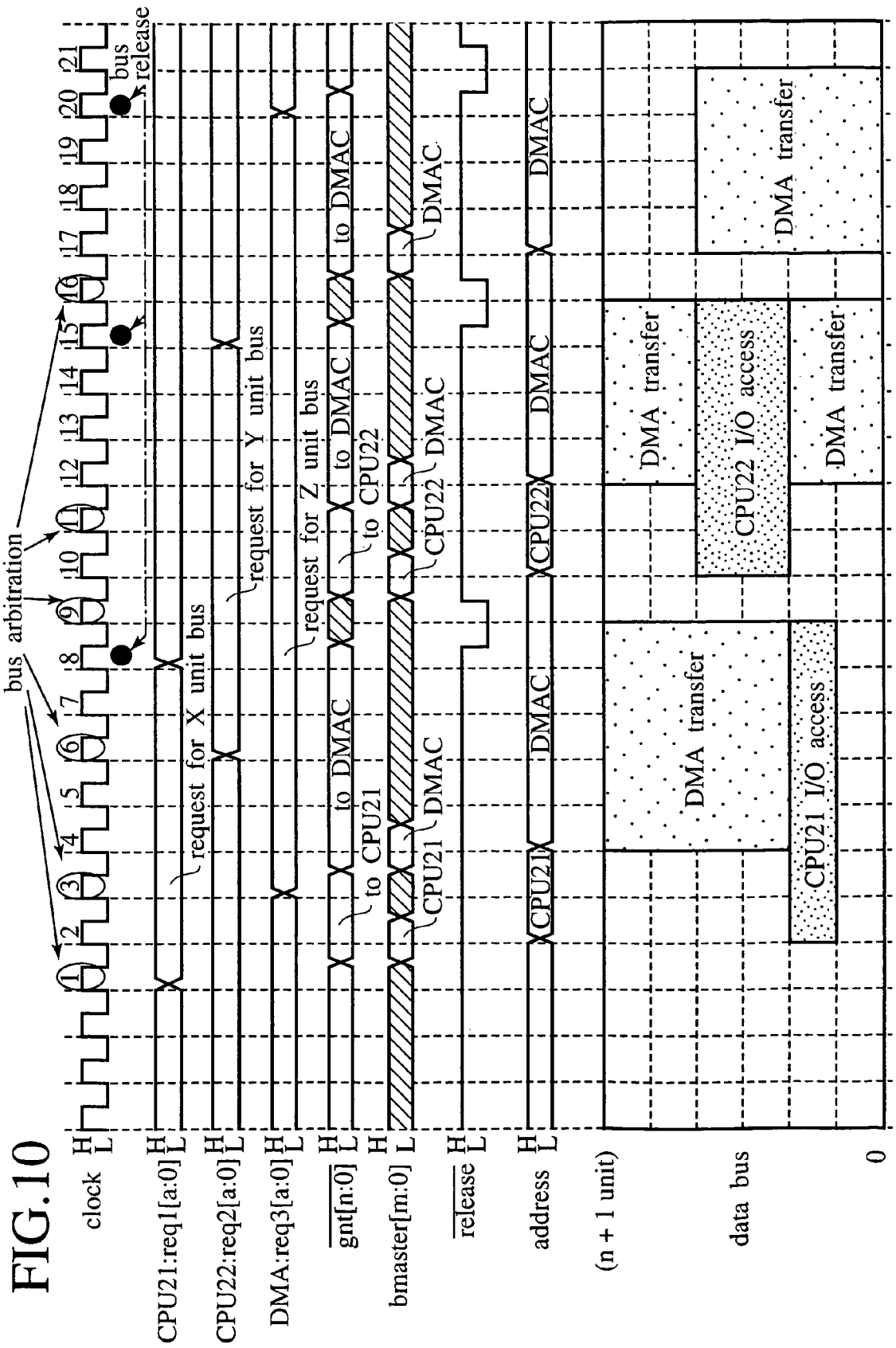
FIG. 10 is a view showing operation timing and an occupancy state of the use of the data bus in the information processing system in FIG. 9.

The following description will describe in detail a third embodiment of the information processing system according to the present invention as to the differences from the first and second embodiments alone with reference to FIGS. 9 and 10.

Different from the second embodiment shown in FIG. 7, the third embodiment provides a function to allow the bus masters to select necessary units in the data bus to be split-controlled.

An information processing system having a plurality of bus masters according to the third embodiment shown in FIG. 9 comprises a CPU 21, a CPU 22, and a DMAC 23 serving as the bus masters, peripheral apparatuses including a memory 28 and peripherals 29 and 30, a data bus 25 split into (n+1) units to be split-controlled, a bus controller (BusCntl) 24 for split-controlling the data bus, and an address bus (adrbus) 26.

In the information processing system shown in FIG. 9, the split-control of the data bus is realized by a bus request signal (req1[a:0], req2[a:0], req3[a:0]) from each bus master, a bus grant signal (gnt[n:0]), a bus master select signal (bmaster[m:0]) which selects the bus master to receive the bus grant signal, a bus select signal (bsel[n:0]) which selects the bus to be used for the DMA data transfer, and a bus release signal (brelease) with which the bus controller makes each bus master abandon the bus use.

Each bit in the bus grant signal (gnt [n:0]) and bus select signal (bsel[n:0]) corresponds to each unit in the bus to be split-controlled. The (a+1) (a must satisfy $2^{**}(a+1)=<(n+1)$) bits in each bus request (req1[a:0], req2[a:0], req3[a:0]) represent the number of bus units ([a:0] unit) necessary for each bus master out of the (n+1) units in the data bus to be split-controlled. In the third embodiment, the (m+1) (m is a numerical value equal to or larger than one) bits in the bus master select signal (bmaster[m:0]) select one of the m (three in FIG. 9) bus masters uniquely.

FIG. 10 is a view showing operation timing of each control signal and the bus in the system shown in FIG. 9, and particularly a timing chart when bus requests are issued successively from the DMA 23 and CPU 22 while the CPU 21 is requesting the bus.

In the cycle 1 (the cycle denoted as 1 in the clock timing chart of FIG. 10) in FIG. 10, x units in the split-controlled (n+1) units are requested by the req1[a:0] from the CPU 21, and in response to this request, the bus controller (BusCntl) 24 carries out the bus arbitration operation. After the bus arbitration, the BusCntl 24 outputs the gnt[n:0] signal and bmaster[m:0] signal. In the cycle 2, the CPU 21 starts to use the data bus in response to the gnt[n:0] signal. After granting the bus use to the bus master, the bmaster signal is deasserted temporarily. In FIG. 10, hatched areas in the gnt signal and bmaster signal indicate inactive states of these signals.

In the cycle 3, the DMAC 23 requests z units while the CPU 21 is using the data bus, and the BusCntl 24 carries out the bus arbitration operation again. The BusCntl 24 confirms whether z units in the data bus are available depending on the current availability of the data bus. When the z units are available, the BusCntl 24 outputs the gnt [n:0] signal and bmaster [m:0] signal; otherwise, the BusCntl 24 maintains the current state until the bus becomes available. Because the third embodiment explains the former case, the BusCntl 24 outputs the gnt[n:0] signal and bmaster[m:0] signal. In the cycle 4, the DMAC 23 starts to use the data bus in response to the gnt[n:0] signal, whereby the CPU 21 and DMAC 23 use the data bus simultaneously. After granting the bus use to the bus master, the bmaster signal is deasserted temporarily.

In the cycle 6, the CPU 22 requests y units in the bus while the CPU 21 and DMAC 23 are using the data bus, and the BusCntl 24 carries out the bus arbitration operation again. The BusCntl 24 confirms whether y units in the data bus are available depending on the current availability of the data bus. When the y units are available, the BusCntl 24 outputs the gnt[n:0] signal and bmaster [m:0] signal; otherwise, the BusCntl 24 maintains the current state until the bus becomes available. Because the third embodiment explains the latter case, the BusCntl 24 maintains the current state.

In the cycle 8, the bus operation of the CPU 21 using the x units in the bus is completed, and its request signal (req1[a:0]) is deasserted. Accordingly, the BusCntl 24 asserts the bus release signal (brelease) which makes each bus master release the bus to carry out the bus arbitration again. In the cycle 9, each bus master (21, 22, 23) suspends the bus operation in response to the brelease signal and maintains the suspended state until the bus use is granted. Meanwhile, the BusCntl 24 arbitrates the bus request from each bus master again, and carries out the bus arbitration operation in accordance with the priority assigned to each bus master. Assume that the priority is given as CPU 22>DMAC 23 in the third embodiment, then the BusCntl 24 outputs the gnt[n:0] signal and bmaster[m:0] signal to grant the bus use to the CPU 22 which is requesting the y units. In the cycle 10, the CPU 22 starts to use the data bus in response to the gnt[n:0] signal. After granting the bus use to the bus master, the bmaster signal is deasserted temporarily.

In the cycle 11, the BusCntl 24 carries out the bus arbitration operation for the remaining bus request. The BusCntl 24 confirms whether z units in the data bus are available depending on the current availability of the data bus. When the z units are available, the BusCntl 24 outputs the gnt[n:0] signal and bmaster [m:0] signal; otherwise, the BusCntl 24 maintains the current state until the bus becomes available. Because the cycle 11 in FIG. 10 explains the former case, the BusCntl 24 outputs the gnt[n:0] signal and bmaster [m:0] signal. In the cycle 12, the DMAC 23 starts to use the data bus in response to the gnt[n:0] signal, whereby the CPU 22 and DMAC 23 use the data bus simultaneously. After granting the bus use to the bus master, the bmaster signal is deasserted again.

In the cycle 15, the bus operation of the CPU 22 using the y units in the bus is completed, and its request signal (req2[a:0]) is deasserted. Hence, the BusCntl 24 asserts the bus release signal (brelease) which makes each bus master release the bus to carry out the bus arbitration again. In the cycle 16, each bus master suspends the bus operation in response to the brelease signal, and maintains the suspended state until the bus right is granted. Meanwhile, the BusCntl 24 arbitrates the bus request from each bus master again, and carries out the bus arbitration operation in accordance with the priority assigned to each bus master. At this point, because only the bus request from the DMAC 23 requesting the z units in the bus is left, the BusCntl 24 outputs the gnt[n:0] signal and bmaster[m:0] signal corresponding to the bus arbitration operation. In the cycle 17, the DMAC 23 starts to use the data bus in accordance with the gnt[n:0] signal. After granting the bus use to the bus master, the bmaster signal is deasserted again.

In the cycle 20, the bus operation of the DMAC 23 using the z units in the bus is completed, and its request signal (req3[a:0]) is deasserted. Hence, the BusCntl 24 asserts the bus release signal (brelease) which makes each bus master release the bus to carry out the bus arbitration again. In the cycle 21, each bus master suspends the bus operation in response to the brealese signal, and maintains the suspended state until the bus use is granted. Meanwhile, the BusCntl 24 arbitrates the bus request from each bus master again, and carries out the bus arbitration operation in accordance with the priority assigned to each bus master.

According to the third embodiment, a plurality bus masters request the use of the data bus by specifying the necessary number of units in the data bus 25. Consequently, the split-control of the data bus 25 can be realized by an easy control at the bus masters side.

Fourth Embodiment

Figure 11:
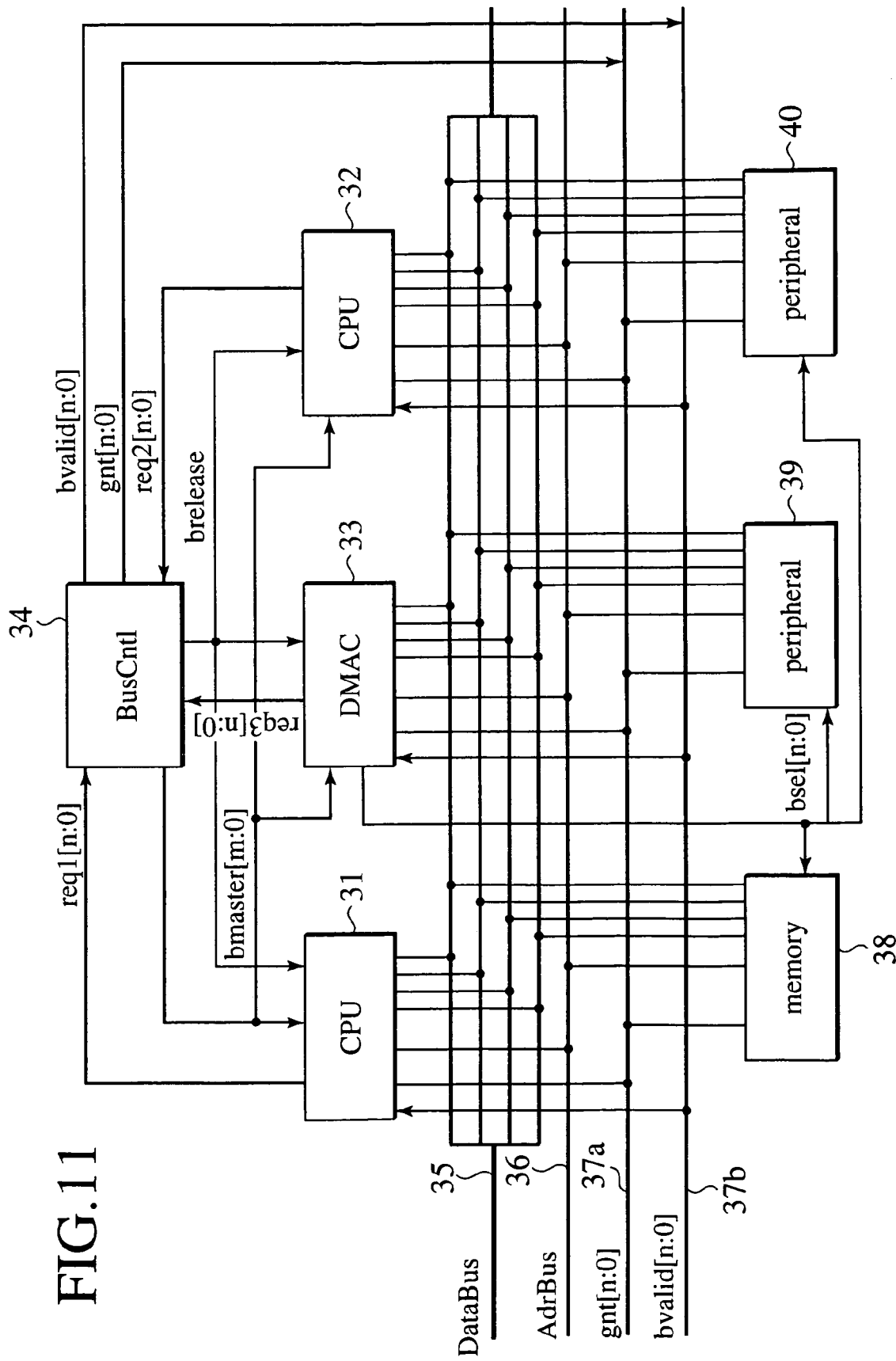
FIG. 11 is a block diagram depicting an arrangement of an information processing system according to a fourth embodiment of the present invention.
Figure 12:
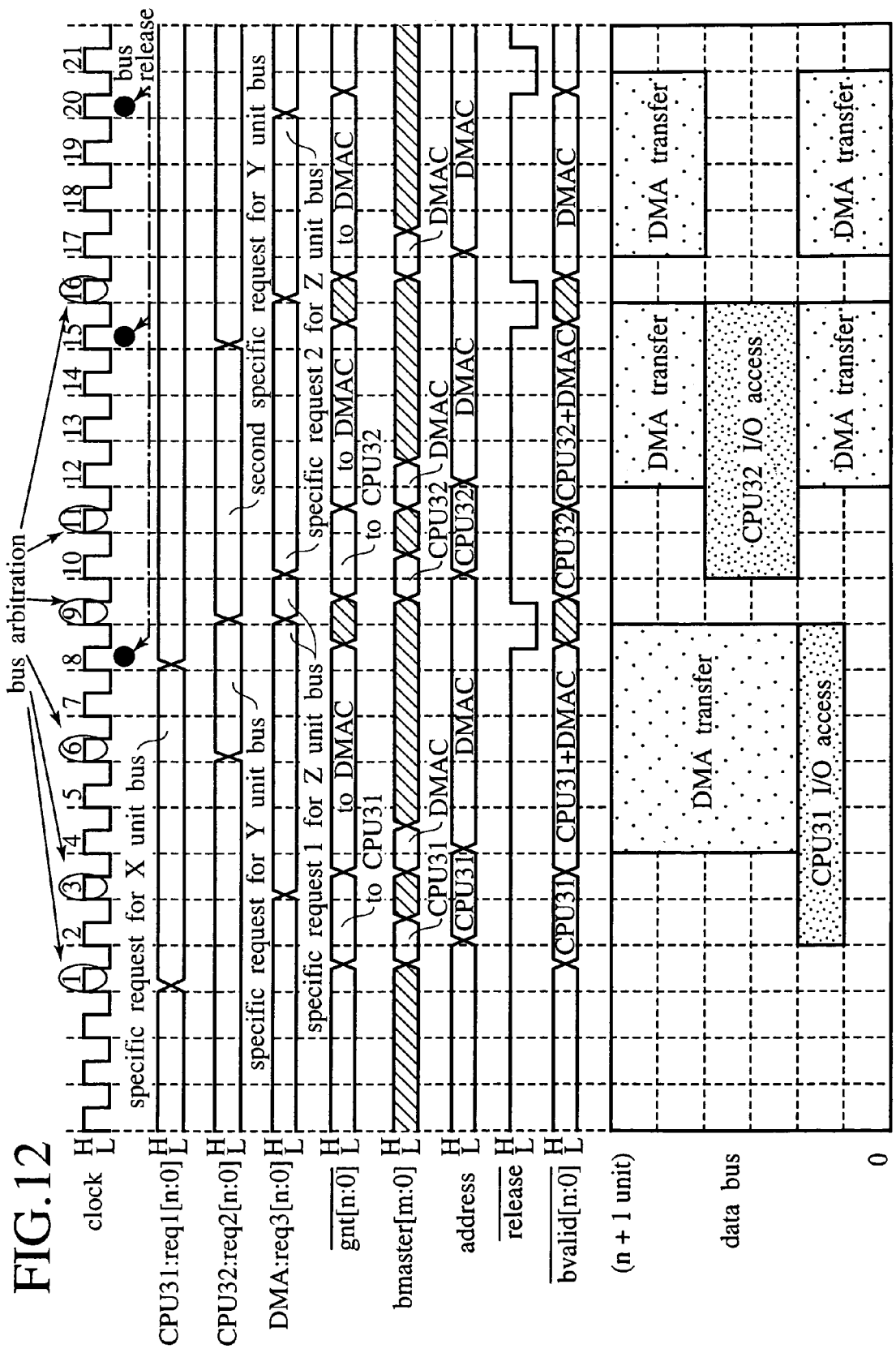
FIG. 12 is a view showing operation timing and an occupancy state of the use of the data bus in the information processing system in FIG. 11.

The following description will describe in detail a fourth embodiment of the information processing system according to the present invention as to the differences from the foregoing embodiments alone with reference to FIGS. 11 and 12.

The fourth embodiment provides a function such that the bus controller monitors the availability of the data bus in unit data buses and sends a signal indicating the availability of the data bus to each bus master, and in response to that signal, each bus master uses the data bus by specifying the necessary unit data buses to be split-controlled.

As shown in FIG. 11, an information processing system according to the fourth embodiment comprises a CPU 31, a CPU 32, and a DMAC 33 serving as the bus masters, peripheral apparatuses including a memory 38 and peripherals 39 and 40, a data bus 35 which can be split into (n+1) units to be split-controlled, a bus controller (BusCntl) 34 for split-controlling the data bus, and an address bus (adrBus) 36.

The information processing system in FIG. 11 realizes the split-control of the data bus by a bus request signal from each bus master (req1[n:0], req2[n:0], req3[n:0]), a bus grant signal (gnt[n:0]), a bus master select signal (bmaster[m:0]) which selects the bus master to receive the bus grant signal, a bus select signal (bsel[n:0]) which selects the bus to be used for the DMA data transfer, a bus release signal (brelease) which makes each bus master abandon the bus use(bus access), and a control signal (bvalid[n:0]) which indicates the availability of the data bus being used.

Each bit in each bus request signal (req1[n:0], req2[n:0], req3[n:0]), bus grant signal (gnt[n:0]), bus select signal (bsel[n:0]), and control signal (bvalid[n:0]) indicating the availability of the data bus corresponds to each unit bus in the bus to be split-controlled. In FIG. 11, the (m+1) (m is a numerical value equal to or larger than one) bits in the bus master select signal (bmaster[m:0]) select one of the m (three in FIG. 11) bus masters uniquely.

FIG. 12 is a view showing the operation timing of each control signal and bus operation in the system shown in FIG. 11, and particularly a timing chart when bus requests are issued successively from the DMAC 33 and CPU 32 while the CPU 31 is requesting the bus.

In the cycle 1 (the cycle denoted as 1 in the clock timing chart of FIG. 12) in FIG. 12, x units in the split-controlled (n+1) units are requested from the CPU 31, and in response to this request, the BusCntl 34 carries out the bus arbitration operation. After the bus arbitration, the BusCntl 34 outputs the gnt[n:0] signal, bmaster[m:0] signal, and bvalid[n:0]

signal, all corresponding to the req1[n:0] signal. In the cycle 2, the CPU 31 starts to use the data bus requested by the req1[n:0] signal in response to the gnt[n:0] signal. After granting the bus use to the bus master, the bmaster signal is deasserted temporarily.

In the cycle 3, the DMAC 33 requests z units while the CPU 31 is using the data bus. Prior to the output of the request signal, the DMAC 33 confirms whether the z units can be secured in the available bus units in the split-controlled data bus by checking the bvalid[n:0] signal outputted from the BusCntl 34. When there are available z units in the data bus, the DMAC 33 outputs the req3[n:0] signal corresponding to the available units in the data bus. Otherwise, when there are not available z units in the data bus, the DMAC 33 requests the necessary z units in the bus by the req3[n:0] signal regardless of whether the z units are available or not.

The BusCntl 34 carries out the bus arbitration operation again in response to the bus request from the DMAC 33. The BusCntl 34 confirms whether the z units in the data bus requested by the req3[n:0] signal are available from the current availability of the data bus. When the z units are available, the BusCntl 34 outputs the gnt[n:0] signal, bmaster [m:0] signal, and bvalid signal[n:0]; otherwise, the BusCntl 34 maintains the current state until the bus becomes available. Because the cycle 3 of FIG. 12 explains the former case, the BusCntl 34 outputs the gnt[n:0] signal, bmaster [m:0] signal, and the bvalid[n:0] signal indicating the availability of the data bus the CPU 31 and DMAC 33 are currently using, all corresponding to the req3[n:0] signal. In the cycle 4, the DMAC 33 starts to use the data bus in response to the gnt[n:0] signal, whereby the CPU 31 and DMAC 33 use the data bus simultaneously. After granting the bus use to the bus master, the bmaster signal is deasserted temporarily.

In the cycle 6, the CPU 32 requests y units in the bus while the CPU 31 and DMAC 33 are using the data bus. Prior to the output of the request signal, the CPU 32 confirms whether the y units can be secured in the available bus units in the split-controlled data bus by checking the bvalid[n:0] signal outputted from the BusCntl 34. When there are available y units in the data bus, the CPU 32 outputs the req2[n:0] signal in accordance with the available units in the data bus. Otherwise, when there are not available y units in the data bus, the CPU 32 requests the necessary units by the req2[n:0] signal regardless of whether they units are available or not.

The BusCntl 34 carries out the bus arbitration operation again in response to the bus request from the CPU 32. The BusCntl 34 confirms whether y units in the data bus requested by the req2[n:0] signal are available from the current availability of the data bus. When the y units are available, the BusCntl 34 outputs the gnt[n:0] signal, bmaster [m:0] signal, and bvalid[n:0] signal; otherwise, the BusCntl 34 maintains the current state until the bus becomes available. Because the cycle 7 of FIG. 12 explains the latter case, the BusCntl 34 maintains the current state.

In the cycle 8, the bus operation of the CPU 31 using the specified x units in the data bus is completed, and its request signal (req1[n:0]) is deasserted. Hence, the BusCntl 34 asserts the bus release signal (brelease) which makes each bus master release the bus and deasserts the bvalid[n:0] signal to carry out the bus arbitration again. In the cycle 9, each bus master suspends the bus operation in response to the brelease signal and maintains the suspended state until the bus use is granted. Meanwhile, the BusCntl 34 arbitrates the bus request from each bus master again, and carries out the bus arbitration operation in accordance with the priority assigned to each bus master. Assume that the priority is assigned as CPU 32>DMAC 33 in the fourth embodiment, then the BusCntl 34 outputs the gnt[n:0] signal, bmaster[m:0] signal, and bvalid[n:0] signal, all corresponding to the req2[n:0] signal, to grant the bus use to the CPU 32 which is requesting the y units. In the cycle 10, the CPU 32 starts to use the data bus in response to the gnt[n:0] signal. After granting the bus use to the bus master, the bmaster signal is deasserted temporarily.

The DMAC 33, to which the bus use is not granted when the bmaster signal is activated, confirms again whether the z units in the bus can be secured in the available bus units in the split-controlled data bus. When there are available z units in the data bus, the DMAC 33 outputs the req3[n:0] signal corresponding to the available units in the data bus. Otherwise, when there are not available z units in the data bus, the DMAC 33 requests the necessary z units in the bus by the req3[n:0] signal regardless of whether the z units are available or not.

In the cycle 11, the BusCntl 34 carries out the bus arbitration operation. The BusCntl 34 confirms whether the z units in the data bus are available from the current availability of the data bus. When the z units are available, the BusCntl 34 outputs the gnt[n:0] signal, bmaster [m:0] signal, and the bvalid[n:0] signal, all corresponding to the req3[n:0] signal; otherwise, the BusCntl 34 maintains the current state until the bus becomes available. Because the cycle 11 of FIG. 12 explains the former case, the BusCntl 34 outputs the gnt[n:0] signal, bmaster [m:0] signal, and the bvalid[n:0] signal indicating the state of the data bus the CPU 32 and DMAC 33 are using, all corresponding to the req3[n:0] signal. In the cycle 12, the DMAC 33 starts to use the data bus in response to the gnt[n:0] signal outputted according to the req3[n:0] signal, whereby the CPU 32 and DMAC 33 use the data bus simultaneously. After granting the bus use to the bus master, the bmaster signal is deasserted again.

In the cycle 15, the bus operation (bus occupation) of the CPU 32 using the y units in the bus is completed, and its request signal (req2[n:0]) is deasserted. Hence, the BusCntl 34 asserts the bus release signal (brelease) which makes each bus master release the bus and deasserts the bvalid[n:0] signal to carry out the bus arbitration again. In the cycle 16, each bus master suspends the bus operation in response to the brelease signal, and maintains the suspended state until the bus use is granted.

Meanwhile, the BusCntl 34 arbitrates the bus request from each bus master again, and carries out the bus arbitration operation in accordance with the priority assigned to each bus master. At this point, because only the bus request from the DMAC 33 requesting the z units in the bus is left, the BusCntl 34 outputs the gnt[n:0] signal to the DMAC 33, bmaster[m:0] signal, and bvalid[n:0] signal corresponding to the bus arbitration operation. In the cycle 17, the DMAC 33 starts to use the data bus in response to the gnt[n:0] signal outputted corresponding to the req3[n:0] signal. After granting the bus use to the bus master, the bmaster signal is deasserted again.

In the cycle 20, the bus operation of the DMAC 33 using the z units in the bus is completed, and its request signal (req3[n:0]) is deasserted. Hence, the BusCntl 34 asserts the bus release signal (brelease) which makes each bus master release the bus and deasserts the bvalid[n:0] signal to carry out the bus arbitration again.

In the cycle 21, each bus master suspends the bus operation in response to the brealese signal, and maintains the suspended state until the bus use is granted. Meanwhile, the BusCntl 34 arbitrates the bus request from each bus master again, and carries out the bus arbitration operation in accordance with the priority assigned to each bus master.

According to the fourth embodiment, a plurality of bus masters request the use of the data bus by specifying the necessary unit data buses in the data bus 15 depending on the availability of the data bus notified from the bus controller 14. Consequently, the efficient split-control of the data bus 15 can be realized.

In the foregoing embodiments, the I/O was used as an example of the peripheral apparatus. However, the peripheral apparatuses are not limited to the I/O, and can be any apparatus capable of carrying out data transfer with the bus masters through the data bus. In the foregoing embodiments, the memory and the peripheral apparatuses are explained as independent components, but the memory should be regarded as one of the peripheral apparatuses. In addition, the DMA data transfer by the DMAC is an example of the data transfer through the data bus, and any other data transfer mechanism can be adopted as well.

The arrangement of the present invention can be realized by a 1-chip semiconductor integrated circuit. The present invention can be realized by making a part of the arrangement, such as the memory and peripheral apparatuses, as an external arrangement provided at the outside of the chip.

In summary, according to the present invention, because the bus controller carries out the data bus arbitration by split-controlling the data bus in response to the bus use requests of the data bus from a plurality of bus masters, the utilization of the data bus can be enhanced. Consequently, not only can the efficiency of the data transfer in the DMA transfer be improved, but also the CPU stall period can be shortened.

It is to be noted that, besides those already mentioned above, many modifications and variations of the above embodiments may be made without departing from the novel and advantageous features of the present invention. Accordingly, all such modifications and variations are intended to be included with the scope of the appended claims.

What is claimed is:

1. A data transfer control circuit for carrying out data transfer by using a plurality of bus masters, comprising:
    a data bus connected to a peripheral apparatus, said data bus having a plurality of unit data buses, each of which transfers data concurrently;
    a plurality of bus masters connected to each of the unit data buses and configured to send a bus request signal requesting to acquire a use of each of said unit data buses, and to transfer data on said unit data buses requested when a request by means of said bus request signal is granted; and
    one bus controller connected to all of the bus masters and configured to split-control said unit data buses for said plurality of bus masters by giving a grant signal to the bus masters, which grants the use of each of said unit data buses in accordance with said bus request signal, wherein
    the bus request signal is sent to said bus controller prior to data transfer and has a field comprising a plurality of bits for specifying necessary bit width, each of said plurality of bits identifying a respective one of said unit data buses, and said bus controller grants the use of each of said unit data buses specified by the bits of said bus request signal.

2. The data transfer control circuit according to claim 1, wherein:
    said bus controller sends the grant signal to said bus masters based on a bus release requesting signal requesting release of said unit data buses.

3. The data transfer control circuit according to claim 1, wherein:
    said bus controller includes a monitor circuit for monitoring availability of said unit data buses.

4. The data transfer control circuit according to claim 3, wherein:
    said bus controller judges whether said unit data buses of said data bus are available based on a monitoring result of said monitor circuit, and when said unit data buses are available, said bus controller provides the grant signal of the use of said unit data buses to said bus master.

5. The data transfer control circuit according to claim 3, wherein:
    said bus controller sends a state signal indicating the availability of said unit data buses to each of said bus masters based on a monitoring result of said monitor circuit.

6. The data transfer control circuit according to claim 1, wherein:
    said bus request signal includes information specifying each unit data bus in said data bus.

7. The data transfer control circuit according to claim 1, wherein:
    said bus request signal includes information specifying the number of the unit data buses in said data bus.

8. An information processing system for carrying out data transfer by using a plurality of bus masters, comprising:
    a peripheral apparatus;
    a data bus connected to a peripheral apparatus, said data bus having a plurality of unit data buses, each of which transfers data concurrently;
    a plurality of bus masters connected to each of the unit data buses and configured to send a bus request signal requesting to acquire a use of each of said unit data buses and to transfer data on said unit data buses requested when a request by means of said bus request signal is granted; and
    one bus controller connected to all of the bus masters and configured to split-control said unit data buses for said plurality of bus masters by giving a grant signal to the bus masters, which grants the use of each of said unit data buses in accordance with said bus request signal, wherein
    the bus request signal is sent to said bus controller prior to data transfer and has a field comprising a plurality of bits for specifying necessary bit width, each of which said plurality of bits identifying respective one of said unit data buses, and said bus controller grants the use of each of said unit data buses specified by the bits of said bus request signal.

9. The information processing system according to claim 8, wherein:
    said bus controller sends the grant signal to said bus masters based on a bus release requesting signal requesting a release of said unit data buses.

10. The information processing system according to claim 8, wherein:
    said bus controller includes a monitor circuit for monitoring availability of said unit data buses.

11. The information processing system according to claim 10, wherein:

said bus controller judges whether said unit data buses of said data bus are available based on a monitoring result of said monitor circuit, and when said unit data buses are available, said bus controller gives the grant signal of the use of said unit data buses to said bus master.

12. The information processing system according to claim 10, wherein:
said bus controller sends a state signal indicating the availability of said unit data buses to each of said bus masters based on a monitoring result of said monitor circuit.

13. The information processing system according to claim 8, wherein:
said bus request signal includes information specifying each unit data bus in said data bus.

14. The information processing system according to claim 8, wherein:
said bus request signal includes information specifying the number of the unit data buses in said data bus.

15. A method of carrying out data transfer through a data bus having a plurality of unit data buses by using a plurality of bus masters, comprising:
generating a bus request signal requesting to acquire a use of each of unit data buses in each of a plurality of bus masters connected to each of the unit data buses and sending said each bus request signal to a bus controller connected to all of the bus masters prior to data transfer, said data bus being connected to a peripheral apparatus and each of said unit data buses transfers data concurrently;
sending, in response to said bus request signal, a grant signal granting the use of each of said unit data buses to the bus masters in accordance with said bus request signal; and
occupying said unit data buses granted by said grant signal, and carrying out data transfer by using the unit data buses thus occupied, wherein
the bus request signal has a field comprising a plurality of bits for specifying necessart bit width, each of said plurality of bits identifying a respective one of said unit data buses, and said bus controller grants the use of each of said unit data buses specified by the bits of said bus request signal.

16. The method according to claim 15, wherein:
sending of said grant signal includes sending said grant signal based on a bus release requesting signal requesting a release of said unit data buses.

17. The method according to claim 15, further comprising:
monitoring availability of said unit data buses.

18. The method according to claim 17, wherein:
sending of said grant signal includes sending the grant signal based on the availability of said unit data buses.

19. The method according to claim 17, further comprising:
sending a state signal indicating the availability of said unit data buses to each of said bus masters.

20. The method according to claim 15, wherein:
generating of said bus request signal includes generating said bus request signal including-information specifying each unit data bus in said data bus or information specifying the number of the unit data buses in said data bus.

21. A data transfer control circuit for carrying out data transfer by using a plurality of bus masters, comprising:

a data bus connected to a peripheral apparatus, said data bus having a plurality of unit data buses, each of which transfers data concurrently;
a plurality of bus masters connected to each of the unit data buses and configured to send a bus request signal requesting to acquire a use of each of said unit data buses and to transfer data on said unit data buses requested in response to a bus master select signal which indicates the current bus master to which said grant signal is given; and
one bus controller connected to all of the bus masters and configured to split-control said unit data buses for said plurality of bus masters by giving a grant signal to the bus masters, which grants the use of each of said unit data bus in accordance with said bus request signal, and sending said bus master select signal to each of said bus masters, wherein
the request signal is sent to said bus controller prior to data transfer has a field comprising a plurality of bits for specifying necessary bit width, each of said plurality of bits identifying a respective one of said unit data buses, and said bus controller grants the use of each of said unit buses specified by the bits of said bus request signal.

22. An information processing system for carrying out data transfer by using a plurality of bus masters, comprising:
a peripheral apparatus;
a data bus connected to a peripheral apparatus, said data bus having a plurality of unit data buses, each of which transfers data concurrently;
a plurality of bus masters connected to each of the unit data buses and configured to send a bus request signal requesting to acquire a use of each of said unit data buses and to transfer data on said unit data buses requested in response to a bus master select signal which indicates the current bus master to which said grant signal is given; and
one bus controller connected to all of the bus masters and configured to split-control said unit data buses for said plurality of bus masters by giving a grant signal to the bus masters, which grants the use of each of said unit data buses in accordance with said bus request signal, and sending said bus master select signal to each of said bus masters, wherein
the request signal is sent to said bus controller prior to data transfer and has a field comprising a plurality of bits, each of said plurality of bits corresponding to a respective one of said unit data buses for specifying necessary bit width, and said bus controller grants the use of each of said unit buses specified by the bits of said bus request signal.

23. A method of carrying out data transfer through a data bus having a plurality of unit data buses by using a plurality of bus masters, comprising:
generating a bus request signal requesting to acquire a use of each of unit data buses in each of a plurality of bus masters connected to each of the unit data buses and sending, in response to a bus master select signal which indicates the current bus master to which said grant signal is given, said each bus request signal to a bus controller connected to all of the bus masters prior to data transfer, said data bus being connected to a peripheral apparatus and each of said unit data buses transferring data concurrently;
sending, in response to said bus request signal, a grant signal granting the use of each of said unit data buses to the bus masters in accordance with said bus request signal, and sending said bus master select signal to each of said bus masters; and occupying said unit data buses granted by said grant signal, and carrying out data transfer by using the unit data buses thus occupied, wherein the request signal has a field comprising a plurality of bits for specifying necessary but width, each of said plurality of bits identifying a respective one of said unit data buses, and said bus controller grants the use of each of said unit buses specified by the bits of said bus request signal.

24. The data transfer control circuit according to claim 1, wherein said bus controller broadcasts a bus master selection signal to all of said bus masters along with said grant signal, said selection signal indicating a bus master by which said grant signal is to be received.

25. The information processing system according to claim 8, wherein said bus controller broadcasts a bus master selection signal to all of said bus masters along with said grant signal, said selection signal indicating a bus master by which said grant signal is to be received.

26. A data transfer control circuit for carrying out data transfer by using a plurality of bus masters, comprising:

a data bus connected to a peripheral apparatus, said data bus having a plurality of unit data buses, each of which transfers data concurrently;

a plurality of bus masters connected to each of the unit data buses and configured to send a bus request signal requesting to acquire a use of each of said unit data buses prior to data transfer, and to transfer data on said unit data buses requested when a request by means of said bus request signal is granted; and one bus controller connected to all of the bus masters and configured to split-control said unit data buses for said plurality of bus masters by giving a grant signal to the bus masters, which grants the use of each of said unit data buses in accordance with said bus request signal, wherein the request signal has a field comprising a plurality of bits, each of said plurality of bits identifying a respective one of said unit data buses, and said bus master sends the bus request signal to another bus master and the bus controller, and the other bus master determines the availability of each of the unit data buses based on the bus request signal to send the bus request signal specifying available unit data bus.

* * * * *